Jan. 30, 1940.  E. J. SVENSON  2,188,848
COMPUTING DISPENSING DEVICE
Filed July 21, 1937  2 Sheets-Sheet 1
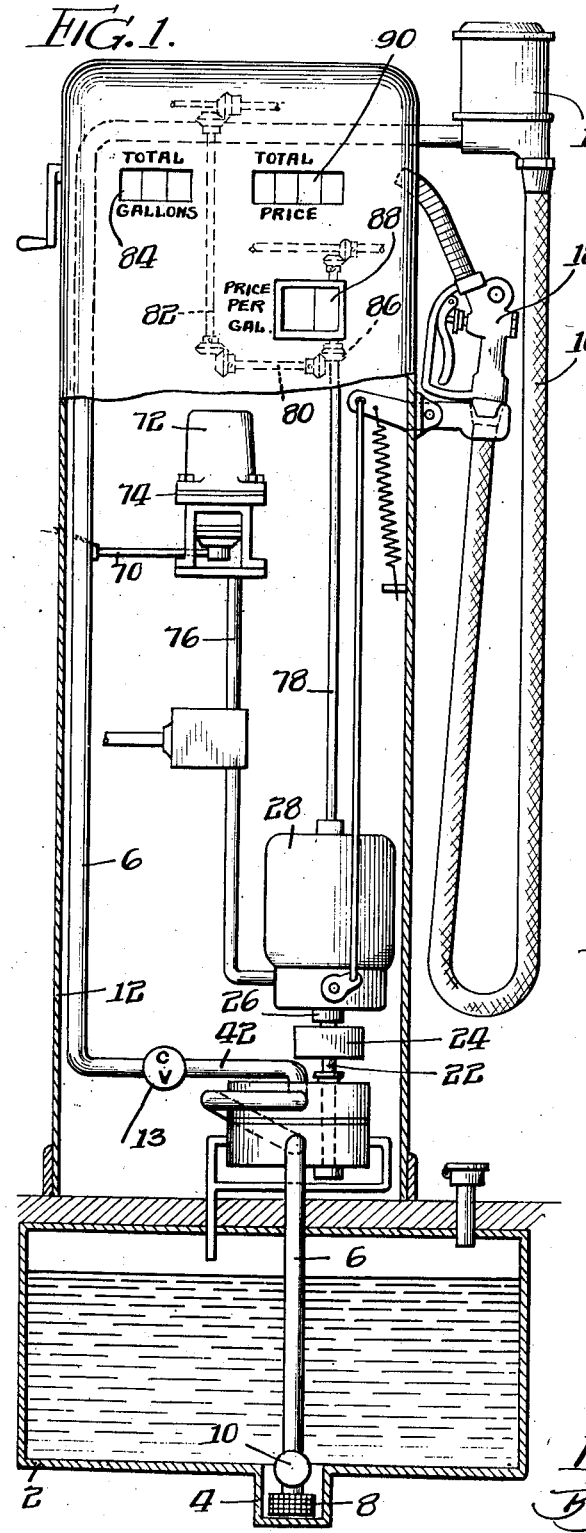
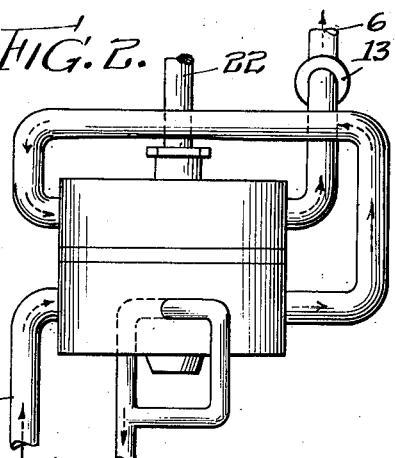
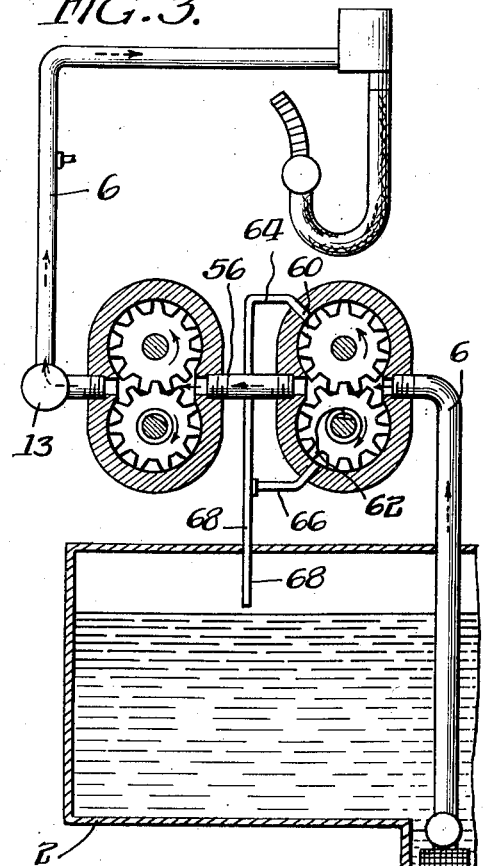
Inventor
Ernest J. Svenson
By:- Cox & Moore attys.

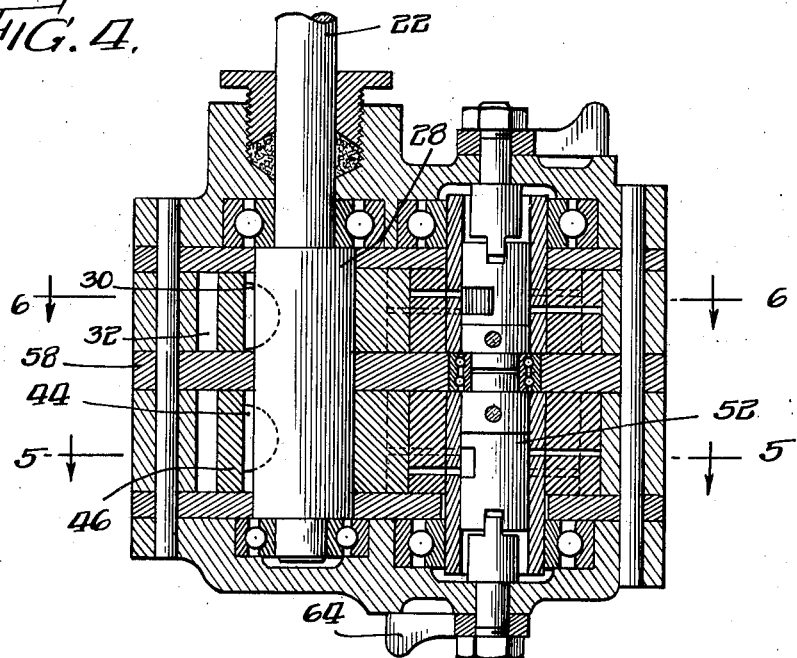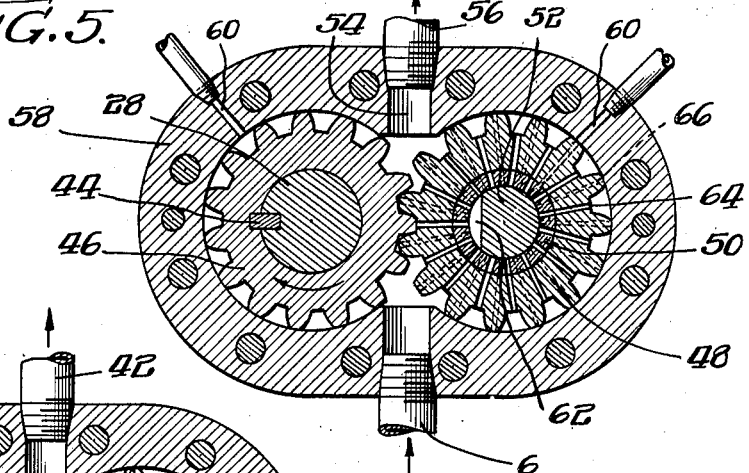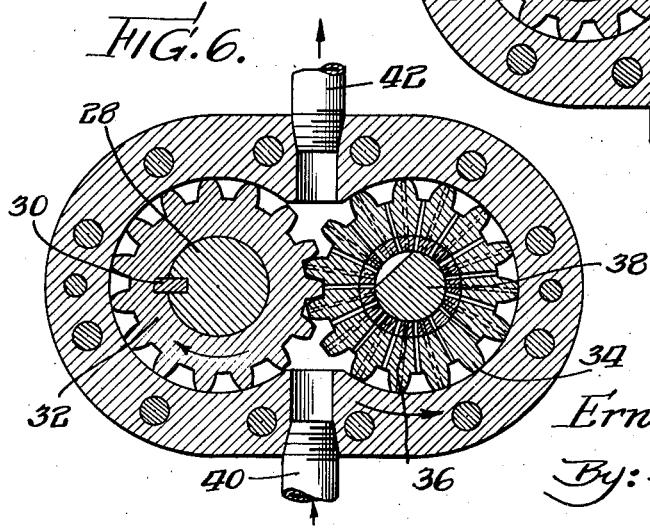

Patented Jan. 30, 1940

2,188,848

UNITED STATES PATENT OFFICE 2,188,848

COMPUTING DISPENSING DEVICE

Ernest J. Svenson, Rockford, Ill., assignor to Petrolator Corporation, Chicago, Ill., a corporation of Illinois Application July 21, 1937, Serial No. 154,690

9 Claims. (Cl. 221—95)

This invention relates to liquid dispensing devices and more particularly to gasoline dispensing devices, of the so-called computer pump type.

Heretofore it has been proposed to construct computer dispensers by providing a liquid forcing pump for drawing liquid from a reservoir, forcing the liquid through a volumetric displacement meter, thence through a flow line which included a dispensing valve. Such pump has heretofore been provided with a by-pass and a motor for driving the pump, the arrangement being such that until the dispensing valve was opened, the motor, in operating the pump, continued to by-pass the liquid around the pump so that instantly upon the opening of the dispensing valve, pressure in the flow line being released, the pump forced the liquid through the flow line and not around the by-pass. In these prior devices, during the operation of the by-pass arrangement the liquid in the flow line was constantly churned and agitated, creating considerable volumes of free gas which is addition to the air in the liquid made it necessary to provide an air and/or gas eliminator in the flow line in advance of the meter so that this air and/or gas would not be measured in passing through the displacement meter. In these prior devices, in addition, the meter spindle was directly coupled to the volume and price registering means, by means including a speed changing device associated with the price registering means, so that as liquid flowed through the flow line in dispensing, the volume of the liquid as well as the cost of the liquid was registered continuously.

Among the objects of the present invention are to provide an improved type of computing dispensing device wherein a distinct departure is made from prior devices by the utilization of a meter pump disposed in the flow line, for not only continuously forcing the liquid through the flow line when the dispensing valve is open but also of itself measuring the volume of the liquid dispensed, and wherein means is provided for insuring the supply, of air-free and gas-free liquid to the meter pump, there being provided means synchronously driven with the meter pump for operating the volume and/or price register; to provide a computer dispenser wherein there are two pumps, one being the meter pump for continuously measuring and forcing liquid through the flow line, and the other pump, which is preferably driven from the same shaft as the meter pump and is of greater capacity than the meter pump, for drawing liquid from the source of supply and continuously feeding the liquid to the meter pump, and particularly for supplying air-free and gas-free liquid to the meter pump at a greater rate than can be taken in by the meter pump, the excess of liquid being returned to the flow line in advance of the suction side of the pump so supplying liquid to the meter pump; to provide a pair of gear pumps, one of which is of larger capacity than that of the other, and has its discharge connected to the inlet of the other, and wherein the pump of larger capacity is provided with means for by-passing excess of liquid which is discharged to said other pump; to provide a pair of gear pumps both driven from a common shaft, one of said gear pumps being of larger capacity than the other, and wherein one or more of said gear pumps is provided with adjustable by-pass means whereby to provide a nicely balanced adjustment for said pumps, the pump of larger capacity being arranged to discharge to the suction side of the other pump; to provide these and other objects of invention as will be apparent from a perusal of the following specification when taken in connection with the accompanying drawings, wherein:

Figure 1 is a front view of one form of my device;

Figure 2 is a diagrammatic view showing the liquid flow line and the manner in which the liquid passes through the meter pump;

Figure 3 is a diagrammatic side view of the same;

Figure 4 is a sectional view showing the meter pump and its air eliminator;

Figures 5 and 6 are sectional views on line 5—5 and 6—6 of Figure 4.

Referring now to the drawings in detail, the mechanism embodied in the instant invention constitutes, in general, a source of liquid supply in the form of a reservoir 2 adapted to contain a quantity of liquid. It is respectfully shown that the device is provided with a depressed portion 4 in which the lower end of the liquid flow line 6 is disposed, being provided thereat with a strainer 8 and the usual type of foot valve 10, this valve being a one-way check valve which permits the liquid to flow up the pipe but holds it against backward movement. This tank is provided with any type of filler and also any type of air breather tube. The tank is preferably located in the ground. Preferably immediately above the tank is located a housing 12 of the desired construction into which the flow line 6 passes, where it connects with the meter pump of the desired construction. In the present instance I prefer to employ a meter pump of a gear tooth construction shown specifically in Figures 4, 5 and 6; however, let it be understood that any type of meter pump incorporating the principles of my present invention will suffice. At the discharge side of the meter pump the flow line 6 is preferably provided with a one-way check valve 13 for holding the liquid in pipe 6 thereabove against reverse movement while permitting its free passage upwardly therethrough. Flow line 6 continues upwardly within the housing 12 to the top thereof, where it connects outside the housing with the usual type of sight gauge 14, connecting in turn with the usual type of flexible hose 16, which in turn terminates in the usual type of nozzle 18 provided with a dispensing valve. As is well known, such a dispensing valve is adapted to swing to closed position, as the flow of the liquid through the nozzle tends to close the valve. The valve is opened by a manually operated lever 20. In addition, the nozzle desired may be provided with a drain valve adapted to preclude draining of the hose when the dispensing operation is completed. The drain valve is set to open only at a certain pressure, thereby maintaining a sufficient pressure on the fluid in the flow line after the dispensing operation is over. Also it is understood that the liquid in the flow line is provided with sufficient restriction to prevent too great a drop in the pressure of the flow line when the dispensing valve is open, while at the same time not sufficiently restricted to interfere with the free flow of the liquid through the flow line during dispensing.

It will be seen, therefore, that after the dispensing operation, when the dispensing valve is closed the flow line between the check valve 13 and the dispensing valve will confine therein a completely full column of incompressible gasoline or other liquid to be dispensed and that said column will be completely stationary and under a definite pressure and therefore will have certain advantages, first, as a liquid lock upon the shiftable member of the meter pump hereinafter to be described; secondly, because of its pressure it will prohibit the entrance of air into the flow line.

In addition, means is provided in association with the meter pump for preventing and/or separating out any air and/or volatile gas which is entrained in the liquid flowing through the dispensing line. In the present instance I have provided a nozzle type of air separating means for the meter pump and have further provided pumping means driven by the same prime mover that drives the meter pump for forcing deaerated, degasified gasoline under pressure through the inlet side of the meter pump. An auxiliary pump delivers more air and gas free fluid to the meter pump than is actually required to completely charge the meter pump and the excess fluid is by-passed. The specific manner of carrying out this arrangement serves the purposes of economy, compactness and simplicity of operation. The construction is illustrated in Figures 2, 3, 4, 5 and 6, and in Figure 4 shows a shaft 22 adapted to be driven through any suitable gear box 24 from the shaft 26 of motor 28. Gear box 24 is inserted preferably to provide convenient gearing for determining the proper rate of rotation of the pump and when once selected such gear ratio is maintained constant. This gear box 24 is not a price selection variator. Shaft 22 is preferably provided with an enlargement 29 to which is keyed at 30 a gear 32 adapted to mesh with gear 34 upon a sleeve 36, which in turn is mounted upon a valve shaft 38, as hereinafter explained, whereby when motor 28 drives shaft 22 the gear 32 will be positively driven and intermeshing gear 34 will serve to force liquid from the inlet side 40 of this gear pump in two parallel paths to the discharge side 42 of this pump in the manner illustrated in Figure 6. From the discharge side 42 liquid passes into the dispensing line 6 on its way to the nozzle valve 18.

I prefer to incorporate the air separating means for the meter pump 32, 34, just described, directly as a part of the same unit and driven from the same shaft 22. To this end the enlargement 29 has keyed thereto at 44, gear 46, which meshes with another gear 48 mounted on the sleeve 50 likewise mounted on a valve shaft 52. The inlet end 6 of the liquid flow line is connected to the inlet side of this pump and upon rotation of the gears 46, 48 liquid will be forced in parallel paths through the discharge side 54 of this pump, from whence the liquid will be forced through pipe 56 to the inlet pipe 40 of the meter pump 32, 34 shown in Figure 6. It will be noted that the pump shown in Figure 5 is of greater capacity than the pump shown in Figure 6. By this means an excess of liquid will be supplied to the inlet side of the meter pump 32, 34. This pump 46, 48 comprises means for constantly charging the meter pump with gas-free and air-free liquid. In other words, through the agency of the pump 46, 48 the meter pump 32, 34 is maintained completely charged at all times during the functioning of these pumps. The casing 58 which encloses and surrounds the pumps shown in Figures 5 and 6 is provided at 60 and 62 with a restricted orifice which connects with pipes 64 and 66, which in turn discharge into a pipe 68, the outlet side of which discharges into the reservoir 2. These restricted passages 60 in the casing 58 open on the inner walls of the casing directly in the path of the interdental spaces of the gears 46 and 48 (see Fig. 5) and are disposed on the discharge side 54 of these gears at a point such that the gears 46 and 48 in their rotation and in forcing the liquid from the inlet side 6 thereof to the outlet side 54 thereof will tend to centrifuge the liquid air in the interdental spaces of these gears. Due to this centrifugal action a distinct pressure will be exerted at the inlet side of the restricted orifice 60 which will tend to force any separated air and gas out through the orifice 60 while tending to hold back the discharge of liquid therefrom. The effect will be the separation of any entrained air and gas and its discharge from the liquid in these interdental spaces. This free air and gas will be discharged through the pipe 68 back to the liquid reservoir. Any liquid which tends to pass through the restricted orifice will thus be discharged into reservoir 2, but the amount of liquid so returned will be practically negligible. Due to the fact that the capacity of the pump 46, 48 is greater than that of pump 42, 44, means is provided for constantly by-passing an adjustable amount of the liquid from the discharge or pressure side 54 of pump 46, 48 back to the suction side 6 thereof and this is accomplished by means of the valve slot 62 in the valve shaft 52. This valve 62 may be adjustably turned by means of the lever 64 (see Fig. 4) to provide any desired by-pass setting. It will thus be seen that by means of the pump 46, 48 the excess of gasoline from which air and gas have been removed are delivered to the suction side 40 of the meter pump 32, 34. It will also be noted that this separation of air and gas is taking place constantly during the rotation of the pump 46, 48 and further that the delivery of excess volumes of liquid by means of this pump 46, 48 to the meter pump 32, 34 is likewise taking place constantly and is accompanied by a continuous by-passing of the excess volume of liquid immediately back to the inlet side of pump 46, 48. The manner of by-passing this fluid is by radially extending passages 64, 66 in the gear 48, which passages connect with the valve 62, for instance, the radial passages on the discharge side 54 of the pump connect with the valve chamber 62 and this valve chamber connects with certain of the other radial passages which in turn connect with the inlet side of the pump. This is accomplished in one setting of the valve, whereas in another setting of the valve communication between the valve chamber 62 and the radial passages communicating with the inlet side of the pump is cut off. By adjusting the valve between these settings, one or more of the radial passages is cut off to provide the necessary adjustment of the by-pass.

In addition, as pointed out in a prior pending application filed by me relating to gasoline dispensing pumps and as claimed in said prior pending application, these radial passages 64, 66 provide means for relieving the pressure in the interdental spaces in which the teeth are intermeshing by passing the liquid which tends to be entrained in said interdental spaces directly to the valve chamber 64. This relief of said liquid prevents the liquid from being crushed in the interdental spaces and cracked with consequent vaporization. Such vaporization would tend to create free gas and hence this free gas is avoided. If desired, I may provide both pairs of pumps 32, 34 and 46, 48 with the radial passages and the by-pass valve arrangement 62 whereby each pump may be adjusted for any by-passing desired and whereby each pump may eliminate the crushing action of the gear teeth and consequent volatilization of gas. The gear teeth are preferably constructed in accordance with the disclosure of my prior Patents No. 1,912,737, dated June 6, 1933, and No. 2,051,914, dated August 25, 1936. It is understood, however, that as to certain features the pumps may take other constructions which will fill the functions desired, and particularly the means for supplying the meter pump with an excess of gasoline from which the air and gas have been eliminated may take other forms. However, I prefer the form illustrated and described herein. The other details of construction of these pumps and the construction and operation of the by-pass setting is fully described in my prior patents above referred to.

In the present construction I prefer to control the motor by means of a pressure line connection 70 to a pressure switch 72 provided with a flexible diaphragm 74 which in turn, by its pressure operated movement, actuates a snap switch for electrically controlling the leads 76 to the motor, the construction of this pressure switch and its manner of operation from the flow line 6 being fully described and claimed in my prior application Serial No. 151,857, filed July 3, 1937. It is sufficient to say that due to the fact that the flow line between the foot valve 10 and the normally closed dispensing valve 18 is constantly maintained completely full of gasoline under a predetermined pressure, the flow line provides a liquid lock for the movable element of the meter pump whereby, upon the cessation of dispensing, the meter pump is instantly held immovable. Immediately upon closing the dispensing valve, the tendency of the meter pump to continue to rotate instantly builds up the pressure of the flow line to such proportions as to instantly actuate the pressure switch, which in turn actuates the snap switch to break the motor circuit to stop the motor, so that the motor stops dead upon the termination of the dispensing operation, which of course causes the registering mechanism directly coupled to the motor to stop dead. Between dispensing operations, the desired pressure is maintained in the flow line by means of the dispensing valve and the foot valve and, due to the fact that the flow line is full of incompressible liquid from which gas and air have been removed, when the dispensing valve is opened the maintained pressure therein drops sufficiently to actuate the flexible diaphragm of the pressure switch, which in turn actuates the snap switch instantly to start the motor circuit for driving the meter pump and the air separating means for the meter pump. Liquid is thus continuously forced through the flow line while the dispensing valve is open, and a registering mechanism which is driven synchronously with the pump registers the volume of such liquid and the cost of such volume of liquid at any selected price per unit of volume in accordance with the setting of a variator. The motor 28 is provided with an extension shaft 78 which through a gear shaft 80, 82 drives the volume indicator 84 and through another gear 86 drives the well-known type of variator 88 which in turn drives the price register 90. The details of construction of the registration of the volume and price registering means in the totalization are well known in the art and need no further illustration or explanation here. They are illustrated and described in one of my prior applications relating to a computing pump. It should be noted that the means described in the present instance for controlling the motor is but illustrative of a number of different ways which have been claimed in certain of my prior pending applications relating to computer pumps. Other ways likewise may be utilized.

The invention is not limited to the use of any particular pump construction but contemplates the use of pumping devices such as plunger pumps, both of the variable and constant displacement types, vein type pumps, and any other pumps which are made with sufficient accuracy so as to render them adaptable for the use contemplated herein.

Having thus described my invention, what I claim as new and desire to secure by Letters Patent of the United States is:

1. In a gasoline dispensing device the combination of a reservoir forming a source of liquid supply, a flow line connected to said reservoir, including a dispensing valve, a meter pump disposed in said flow line, a prime mover for driving said meter pump, and auxiliary pump means connected to said flow line in advance of said meter pump for delivering to the meter pump liquid in an amount at least equal to the volumetric delivery of said meter pump, said auxiliary pump also being driven by said prime mover whereby to correlate the speeds of said meter pump and auxiliary pump.

2. In a gasoline dispensing device the combination of a reservoir forming a source of liquid supply, a flow line connected to said reservoir, including a dispensing valve, a meter pump disposed in said flow line, a prime mover for driving said meter pump, and auxiliary pump means connected to said flow line in advance of said meter pump for delivering to the meter pump liquid in an amount in excess of the volumetric delivery of said meter pump, said auxiliary pump also being driven by said prime mover whereby to correlate the speeds of said meter pump and auxiliary pump.

3. In a gasoline dispensing device the combination of a reservoir forming a source of liquid supply, a flow line connected to said reservoir, including a dispensing valve, a meter pump disposed in said flow line, a prime mover for driving said meter pump, an auxiliary pump in said flow line in advance of said meter pump also driven by said prime mover and having its discharge connected to the inlet side of said meter pump, said auxiliary pump having a greater volumetric displacement than the meter pump, and means for removing the air and gas from the liquid flowing from said auxiliary pump into said meter pump.

4. In a gasoline dispensing device the combination of a reservoir forming a source of liquid supply, a flow line connected to said reservoir, including a dispensing valve, a meter pump disposed in said flow line, a prime mover for driving said meter pump, an auxiliary pump in said flow line in advance of said meter pump and having its discharge connected to the inlet side of said meter pump, said auxiliary pump having a greater volumetric displacement than the meter pump, said auxiliary pump including a pair of intermeshing gears providing a high and low pressure side in said auxiliary pump, means in communication with the interdental spaces of the gears of said auxiliary pump providing a restricted air outlet for permitting the discharge of separated air and gas from the liquid passing through said auxiliary pump, and means providing a by-pass for said auxiliary pump for constantly by-passing the excess portion of the liquid in said auxiliary pump from the discharge side to the inlet side thereof.

5. In a gasoline dispensing device having a reservoir forming a source of liquid supply, and a flow line connected to said reservoir, including a dispensing valve, the combination of a meter pump disposed in said flow line comprising a pair of intermeshing gears, a prime mover directly connected to one of said gears for rotating the same, a second pair of intermeshing gears likewise directly coupled to said prime mover, said second mentioned pair of gears having a greater volumetric displacement than said first mentioned pair of gears, means providing an adjustable by-pass between the high and low pressure side of said second mentioned pair of intermeshing gears, and means in communication with the interdental spaces of said second mentioned pair of gears providing a restricted air outlet for continuously discharging separated air and gas from the liquid in the interdental spaces of said second mentioned pair of gears as they rotate.

6. In a gasoline dispensing device the combination of a reservoir forming a source of liquid supply, a flow line connected to said reservoir, including a dispensing valve, a motor having a drive shaft, a meter pump including a pair of intermeshing gears, one of which gears is directly driven by said motor shaft, a second pair of intermeshing gears, one of which gears is directly driven by said motor shaft, said gears being mounted side by side, a common casing for said gears, one of said pairs of intermeshing gears having a greater volumetric displacement than the other, the pair of intermeshing gears having the larger volumetric capacity being connected to the inlet side of the pair of gears having the relatively smaller volumetric capacity, the discharge side of said latter pair of gears being connected to the dispensing end of the flow line, and means providing air passages in said casing having a restriction therein, said air passages being in communication with said pair of gears having the larger volumetric capacity, said air passages being connected to the reservoir whereby constantly to remove air and gas from the liquid passing through said pair of gears of larger volumetric capacity.

7. In a gasoline dispensing device the combination of a reservoir forming a source of liquid supply, a flow line connected to said reservoir, including a dispensing valve, a motor having a drive shaft, a constant displacement meter pump including a pair of intermeshing gears, one of which gears is directly driven by said motor shaft, a second pair of intermeshing gears, one of which gears is directly driven by said motor shaft, said gears being mounted side by side, a common casing for said gears, one of said pairs of intermeshing gears having a greater volumetric displacement than the other, the pair of intermeshing gears having the larger volumetric capacity being connected to the inlet side of the pair of gears having the relatively smaller volumetric capacity, the discharge side of said latter pair of gears being connected to the dispensing end of the flow line, means providing air passages in said casing having a restriction therein, said air passages being disposed one for each gear of said pair of gears having the larger volumetric capacity and in communication with the interdental spaces of each of said gears, said air passages being connected to the reservoir whereby constantly to remove air and gas from the liquid passing through said pair of gears of larger volumetric capacity, and means for by-passing from the discharge side of the gears of larger volumetric displacement to the suction side thereof a portion of the excess volume of fluid delivered by the gears of larger volumetric capacity.

8. In a gasoline dispensing device having a reservoir forming a source of liquid supply, and a flow line connected to said reservoir, including a dispensing valve, the combination of a motor having a drive shaft, two pairs of intermeshing gears, one gear of each pair of gears being directly keyed to said motor shaft, the discharge side of one pair of gears being coupled to the inlet side of the other pair of gears, the discharge side of said last named pair of gears being connected to the flow line and the inlet side of the first mentioned pair of gears being connected to the source of supply, that pair of gears which is connected to the source of supply having a volumetric displacement in excess of the volumetric displacement of the pair of gears the discharge side of which is connected to the terminal portion of the flow line, means disposed in advance of the inlet side of said last mentioned pair of gears for continuously removing the air and gas from the liquid passing through that pair of gears which is connected to the liquid reservoir, and means providing an adjustable by-pass for each pair of gears.

9. In a gasoline dispensing device the combination of a reservoir forming a source of liquid supply, a flow line connected to said reservoir, including a dispensing valve, a meter pump disposed in said flow line, a prime mover for driving said meter pump, auxiliary pump means connected to said flow line in advance of said meter pump for volumetrically delivering to the meter pump liquid in an amount at least equal to the volumetric delivery of said meter pump, air and gas release means associated with said auxiliary pump means, and cost and volume registers operated by said prime mover in synchronism with said meter pump.

ERNEST J. SVENSON.

CERTIFICATE OF CORRECTION.

Patent No. 2,188,848.　　　　　　　　　　　　　　　January 30, 1940.

ERNEST J. SVENSON.

It is hereby certified that error appears in the printed specification of the above numbered patent requiring correction as follows: Page 1, first column, line 22, for the word "is" read in; and second column, line 34, for "line" read lines; page 2, first column, line 27, strike out "liquid in the" and insert the same before "flow" in line 29; and that the said Letters Patent should be read with this correction therein that the same may conform to the record of the case in the Patent Office.

Signed and sealed this 12th day of March, A. D. 1940.

(Seal)　　　　　　　　　　　　　　　　　　　　　　Henry Van Arsdale,
　　　　　　　　　　　　　　　　　　　　　Acting Commissioner of Patents.